US011917532B2

(12) United States Patent
Qin et al.

(10) Patent No.: US 11,917,532 B2
(45) Date of Patent: Feb. 27, 2024

(54) HANDLING TRANSMIT AND RECEIVE BLANKING FOR MULTI-RAT AND DSDA CAPABLE WIRELESS DEVICES

(71) Applicant: Apple Inc., Cupertino, CA (US)

(72) Inventors: Junzhen Qin, Beijing (CN); Wen Zhao, San Jose, CA (US); Lijie Zhang, Beijing (CN); Lele Cui, Beijing (CN); Wenping Lou, San Jose, CA (US); Qiang Miao, Beijing (CN); Zhiwei Wang, Beijing (CN); Ying Zhang, Beijing (SA); Deepankar Bhattacharjee, Milpitas, CA (US); Kexin Ma, San Diego, CA (US); Alex Yee Kit Ho, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/481,262

(22) Filed: Sep. 21, 2021

(65) Prior Publication Data

US 2023/0088766 A1 Mar. 23, 2023

(51) Int. Cl.
*H04W 48/18* (2009.01)
*H04B 17/318* (2015.01)
(Continued)

(52) U.S. Cl.
CPC .......... *H04W 48/18* (2013.01); *H04B 17/318* (2015.01); *H04W 48/14* (2013.01); *H04W 88/10* (2013.01)

(58) Field of Classification Search
CPC ..... H04W 48/18; H04W 48/14; H04W 88/10; H04B 17/318
(Continued)

(56) References Cited

U.S. PATENT DOCUMENTS

2015/0139015 A1 5/2015 Kadous et al.
2016/0119942 A1 4/2016 Wang
(Continued)

FOREIGN PATENT DOCUMENTS

WO 2016/122773 A1 8/2016
WO 2017/053008 A1 3/2017
(Continued)

OTHER PUBLICATIONS

Partial European Search Report for EP 22196584.1; 14 pages; dated Jan. 25, 2023.

*Primary Examiner* — Huy C Ho
(74) *Attorney, Agent, or Firm* — Kowert, Hood, Munyon, Rankin & Goetzel, P.C.

(57) ABSTRACT

This disclosure relates to techniques for multi-RAT and DSDA capable wireless devices to handle frame blanking in a wireless communication system. A wireless device may establish wireless links according to a first radio access technology and a second radio access technology. The wireless device may determine to perform transmit and receive blanking for one or more antennas of the wireless device for the first radio access technology to perform sounding reference signal transmissions for the second radio access technology based at least in part on a band combination for the wireless links. The wireless device may determine a modification to channel state feedback reporting for the first radio access technology based at least in part on the transmit and receive blanking. The wireless device may perform channel state feedback reporting using the determined modification.

19 Claims, 4 Drawing Sheets

(51) Int. Cl.
*H04W 48/14* (2009.01)
*H04W 88/10* (2009.01)

(58) Field of Classification Search
USPC .......................................................... 370/329
See application file for complete search history.

(56) References Cited

U.S. PATENT DOCUMENTS

2016/0227557 A1* 8/2016 Fanous ................. H04W 72/20
2022/0070953 A1* 3/2022 Gopal .................. H04B 7/0802
2022/0239420 A1* 7/2022 Kumar ................. H04W 72/02

FOREIGN PATENT DOCUMENTS

WO         2021173760       9/2021
WO    WO-2021173760 A1 * 9/2021 ........... H04B 7/0602

\* cited by examiner

US 11,917,532 B2

HANDLING TRANSMIT AND RECEIVE BLANKING FOR MULTI-RAT AND DSDA CAPABLE WIRELESS DEVICES

FIELD

The present application relates to wireless communications, and more particularly to systems, apparatuses, and methods for multi-RAT and DSDA capable wireless devices to handle frame blanking in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for multi-radio access technology and dual subscriber identity module dual active capable wireless devices to handle frame blanking in a wireless communication system.

The techniques described herein may include techniques for mitigating or avoiding at least some effects of transmit and/or receive blanking enforced on a wireless link due to activity on another wireless link. One aspect of these techniques may include modifying channel state feedback reporting for the wireless link that is impacted by the blanking. For example, the channel state feedback could be modified to indicate a lower rank than the highest rank that would be supported by the channel state if no blanking were expected, e.g., in anticipation of the blanking affecting the wireless device's ability to receive high rank communication at a sufficiently low error rate to maintain that rank.

Another possible aspect may include modifying when or how the channel state feedback is provided. For example, if a conflict is detected such that the antenna configured to perform a channel state feedback transmission is blanked during the temporal window in which the channel state feedback transmission is configured, the wireless device may perform antenna reselection such that an antenna that is not blanked during the temporal window in which the channel state feedback transmission is configured can be used to perform the channel state feedback transmission. As another example, in such a scenario, the wireless device may reestablish the wireless link to obtain a different channel state feedback configuration, which may for example include use of a different temporal window to transmit the channel state feedback, which may not be blanked.

Techniques are also described for avoiding rank and/or modulation and coding scheme reduction due to blanking by transmitting an acknowledgement instead of a negative acknowledgement when receive blanking causes failed reception rather than poor channel conditions. Additionally, techniques for performing antenna selection for a wireless link in a manner that includes the possibility of blanking caused by operations according to another wireless link as a consideration for the antenna selection are described herein.

Further, techniques for selectively dropping transmissions that would cause transmit and/or receive blanking on another wireless link are described herein. Such techniques may be used for at least some configurations in which one wireless link is used for voice communications and another wireless link is used for data communications, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
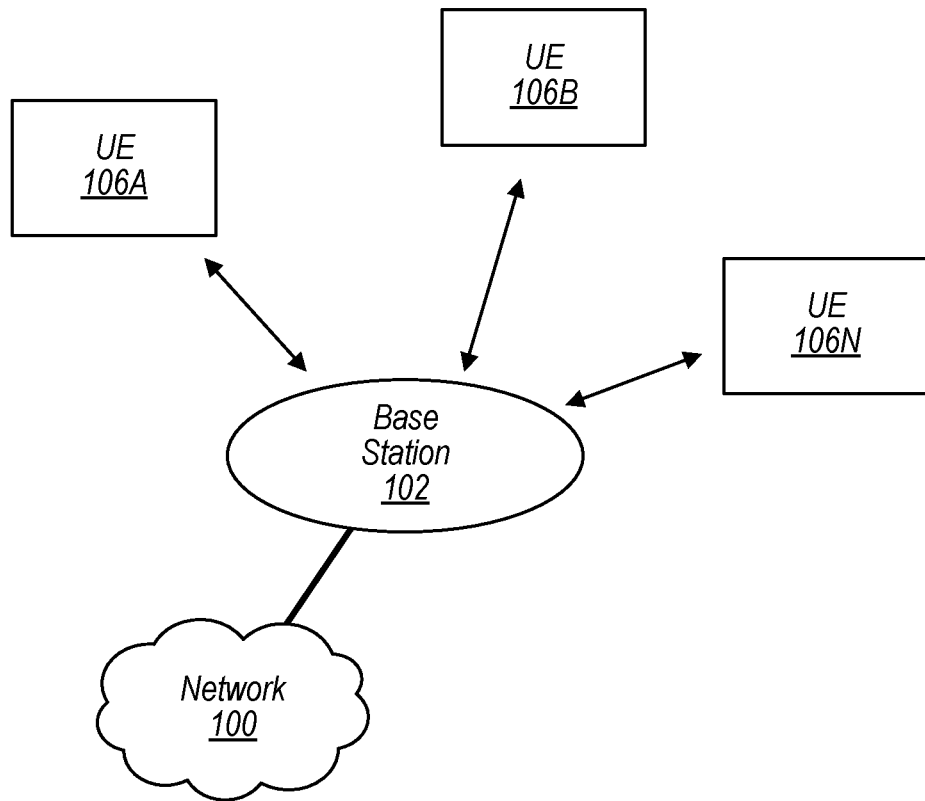
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator
SIM: Subscriber Identity Module Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
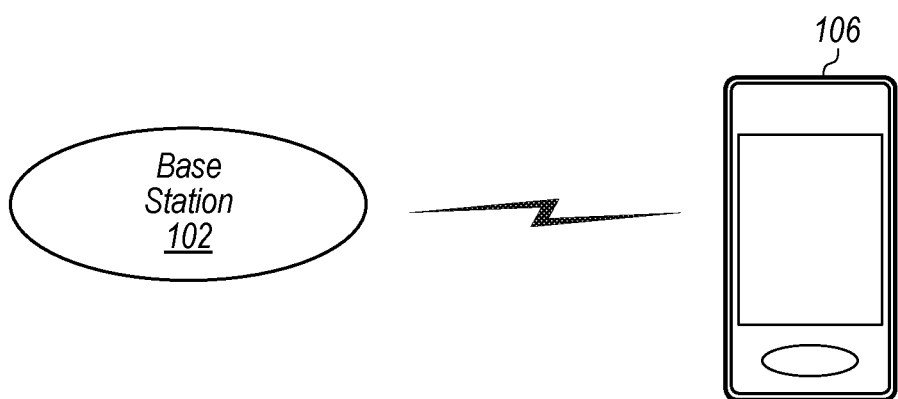
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for multi-RAT capable wireless devices to handle frame blanking in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
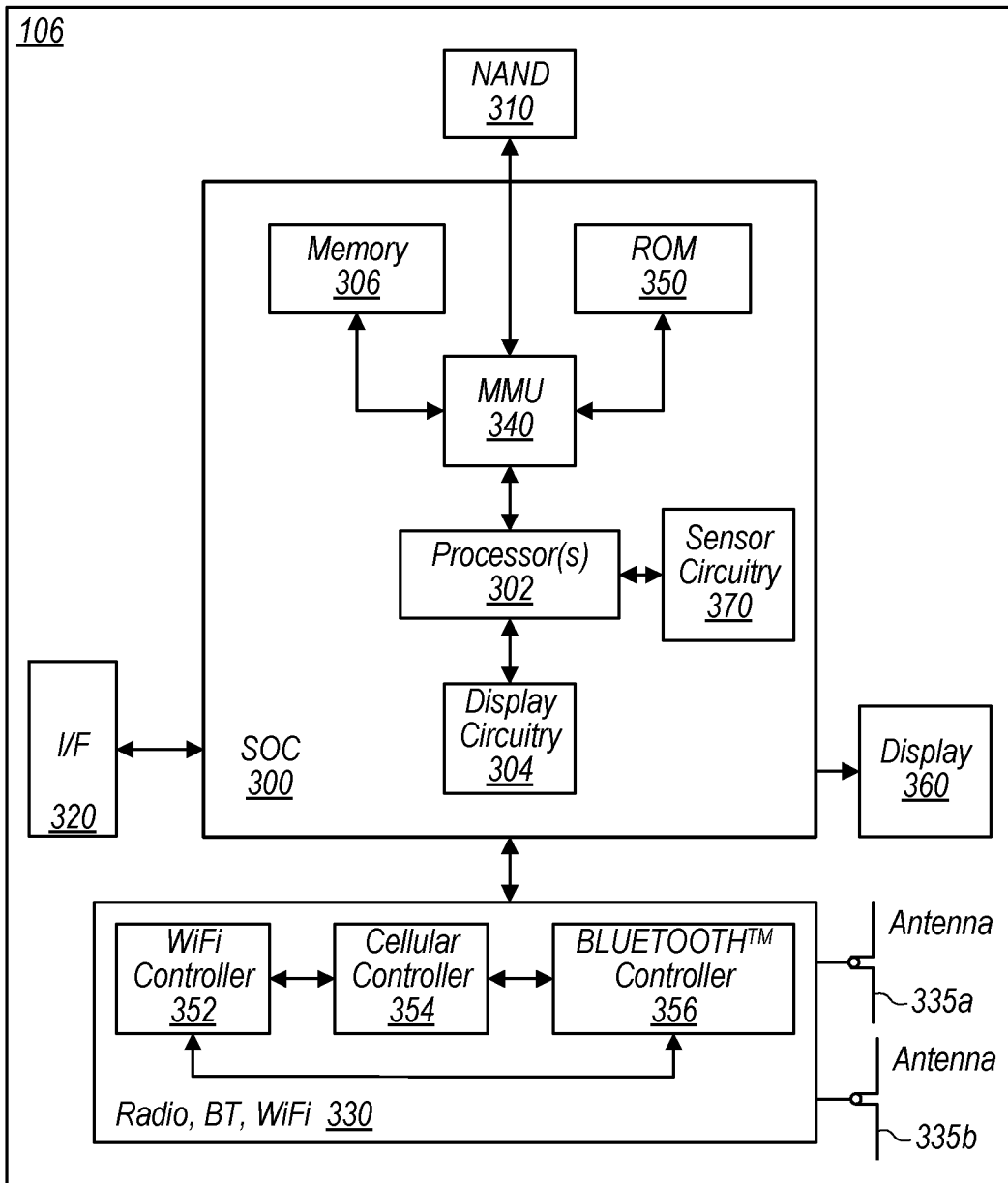
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for handling frame blanking in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for handling frame blanking in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
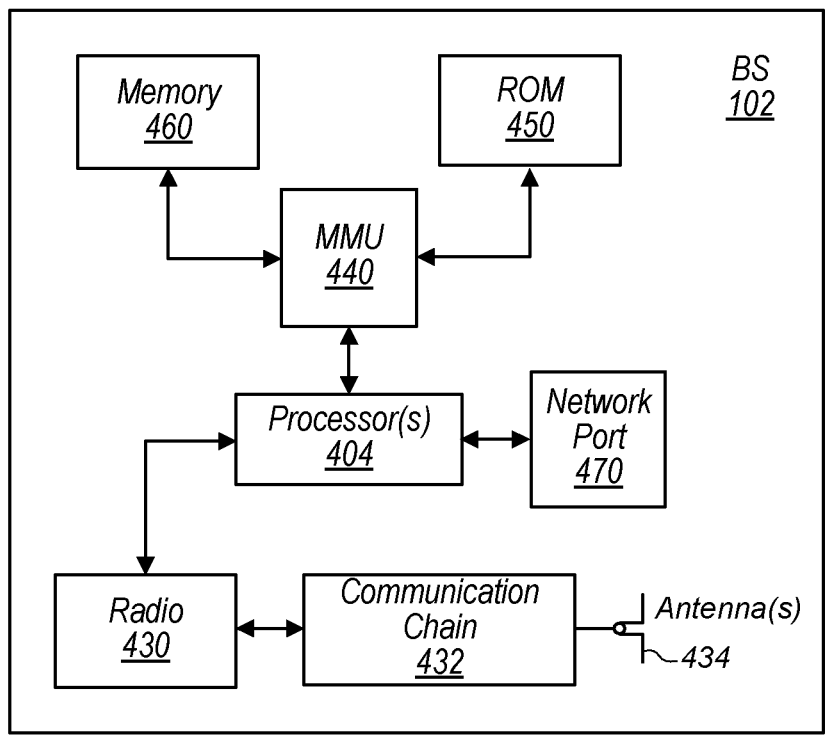
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE, The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low COI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information.

Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t/R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t/R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
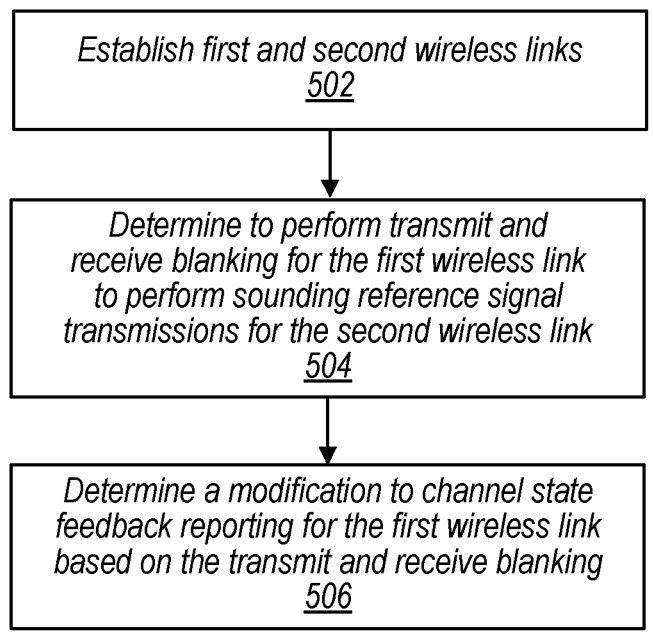
FIG. 5 is a flowchart diagram illustrating aspects of an exemplary possible method for a multi-RAT and/or DSDA capable wireless device to handle frame blanking in a wireless communication system, according to some embodiments.

FIG. 5—Handling Frame Blanking for Multi-RAT and DSDA Capable Wireless Devices

At least in some cases, multi-RAT capable wireless devices may share the use of at least some RF front end components to implement multiple RATs. For example, it may be possible for certain antennas of a wireless device to be used for communicating according to any of multiple cellular communication technologies. Similarly, in some cases, dual SIM dual active (DSDA) capable wireless devices may share the use of at least some RF front end components to concurrently establish and communicate using wireless links associated with different subscriber identities.

Some cellular network deployment configurations may support or even require the ability to simultaneously perform transmission and/or reception according to multiple RATs. For example, a wireless device obtaining 5G non standalone (NSA) service may establish wireless links according to both LTE (e.g., with an anchor LTE cell) and 5G NR (e.g., with a NSA NR cell), and may be expected to perform simultaneous LTE/NR transmission and reception with the LTE and NR cells. In the case of a DSDA wireless device, when both SIMs are active, the wireless device may be independently scheduled for each SIM, which may result in communications being scheduled simultaneously, such that the wireless device may need to or at least significantly benefit from being able to perform simultaneous communication (e.g., according to the same RAT or different RATs) for each SIM.

For at least some band combinations, it may be possible that certain operations performed according to one RAT and/or SIM require transmit and/or receive blanking on the other RAT and/or SIM on the same antenna used for those operations and/or one or more other antennas of the wireless device, e.g., possibly depending on the wireless device design (e.g., the RF front end configuration of the wireless device). The transmit and/or receive blanking on a RAT may include dropping (not performing) any scheduled transmission and/or reception on the RAT for any time period (e.g., subframe(s) or slot(s)) selected for the blanking.

Such transmit and receive blanking can have a variety of possible negative impacts on wireless device performance using a RAT that is subject to such blanking, potentially including reducing throughput, impacting channel state feedback reporting, increasing latency, and/or any of various other impacts, e.g., in different scenarios. However, it may also be possible for a wireless device to recognize when such transmit and receive blanking is occurring, and to attempt to mitigate or reduce the impact of the transmit and receive blanking.

Accordingly, it may be beneficial to provide techniques for multi-RAT and/or DSDA capable wireless devices to handle frame blanking, e.g., in a manner that can potentially reduce negative impacts to the wireless device performance from the frame blanking. To illustrate one such set of possible techniques, FIG. 5 is a flowchart diagram illustrating a method for a multi-RAT and/or DSDA capable wireless device to handle frame blanking in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP, LTE, and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish wireless links with one or more cellular base stations. The wireless links may include a wireless link established according to a first RAT and a wireless link established according to a second RAT. According to some embodiments, the wireless links may include a cellular link according to LTE. For example, the wireless device may establish a session with a mobility management entity of the cellular network by way of an eNB that provides radio access to the cellular network. In some embodiments, the wireless links may include a cellular link according to 5G NR. For example, the wireless device may establish a session with an AMF entity of the cellular network by way of one or more gNBs that provide radio access to the cellular network. In some embodiments, the wireless links may be established in accordance with a 5G NSA network configuration, for example such that a first wireless link is established with a LTE anchor cell, and a second wireless link is established with a NSA NR cell. Other types of cellular links are also possible, and the cellular network may also or alternatively operate according to another cellular communication technology (e.g., UMTS, CDMA2000, GSM, etc.), according to various embodiments.

Alternatively, or additionally, the wireless links may include a wireless link established using a first SIM and a wireless link established using to a second SIM. The wireless links could, for example, include one wireless link established according to LTE and one wireless link established according to NR, two wireless links established according to LTE, two wireless links established according to NR, and/or wireless links established according to any of various other possible RATs. In scenarios in which the wireless links are established using different SIMs, it may be the case that the wireless links provide connections to networks operated by different carriers/network operators.

Establishing the wireless links may include establishing one or more RRC connections with one or more serving cellular base stations, at least according to some embodiments. Establishing the RRC connection(s) may include configuring various parameters for communication between the wireless device and the cellular base station(s), establishing context information for the wireless device, and/or any of various other possible features, e.g., relating to establishing an air interface for the wireless device to perform cellular communication with a cellular network associated with the cellular base station(s). After establishing the RRC connection(s), the wireless device may operate in a RRC connected state with respect to each RAT for which a RRC connection is established. In some instances, the RRC connection(s) may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the multiple wireless links may be established with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may determine to perform transmit and receive blanking for one or more antennas of the wireless device for the first wireless link (e.g., for the first RAT and/or the first SIM) to perform sounding reference signal (SRS) transmissions for the second wireless link (e.g., for the second RAT and/or the second SIM) based at least in part on a band combination for the wireless links established according to the first wireless link and the second wireless link. The transmit and/or receive blanking may apply to a subset (or possibly all) of the antennas of the wireless device in one or more of the subframe or slot before, during, and/or after a SRS transmission according to the second wireless link. The antennas affected for transmit and/or receive operations may depend on the antenna(s) used for the SRS transmission according to the second wireless link, and in the case of receive operations, may also depend on the antenna used for transmission according to the first wireless link. In other words, different antennas may be unavailable for use according to the first wireless link depending on which antenna is being used for the SRS transmission causing the frame blanking.

Note that, at least according to some embodiments, SRS transmissions according to the second wireless link may be performed in a periodic manner, with one or more SRS transmissions being performed by each antenna configured for use according to the second wireless link over the course of the SRS period for the second wireless link. Note also that while transmit and receive blanking may be performed by the wireless device for one or more antennas of the wireless device for the first wireless link to perform SRS transmissions for the second wireless link for the band combination for the wireless links established according to the first wireless link and the second wireless link, it may also be possible that the wireless device does not perform transmit or receive blanking for the first wireless link to perform SRS transmissions for the second wireless link for at least some other possible band combinations for wireless links established according to the first wireless link and the second wireless link. For example, in a scenario in which the first wireless link is established according to LTE and the second RAT is established according to NR, there may be band combinations for which NR SRS transmissions can be performed without blanking LTE receive or transmit operations on any antennas.

In 506, the wireless device may determine one or more modifications to channel state feedback (CSF) reporting for the first wireless link based at least in part on the transmit and receive blanking for one or more antennas of the wireless device for the first wireless link to perform SRS transmissions for the second wireless link. The modification(s) may be selected to attempt to mitigate or reduce any potential negative impact on communications according to the first wireless link that could be caused at least in part by transmit and/receive blanking.

As one possible example of a modification to CSF reporting for the first wireless link, in some instances, the wireless device may determine a rank indicator to report for the first wireless link based at least in part on a SRS period for the second wireless link. This could include modifying a rank indicator selected based on a channel state of the first wireless link to indicate a lower rank, for example if the SRS period for the second wireless link is short enough that antenna unavailability due to SRS triggered receive blanking is expected to affect the ability of the wireless device to maintain the highest rank that could be supported by the channel state of the first wireless link. For example, in some embodiments, the wireless device may determine whether the SRS period for the second wireless link is less than a SRS period threshold, and may also determine whether a downlink block error rate (BLER) for the first wireless link is greater than a downlink BLER threshold. The wireless device may also determine a receive blanking pattern for the first wireless link (e.g., in view of which antennas are currently used for transmission according to each of the first wireless link and the second wireless link and a currently selected set of receive antennas, as one possibility). In such a scenario, at least as one possibility, the rank indicator may be determined based at least in part on the receive blanking pattern for the first wireless link if the SRS period for the second wireless link is less than the SRS period threshold and the downlink BLER for the first wireless link is greater than the downlink BLER threshold.

In some instances, it may also be possible that the wireless device determines a rank indicator to report for the first wireless link based at least in part on the band combination for the first wireless link and the second wireless link, and/or based at least in part on determining that SRS transmissions for the second wireless link cause transmit and receive blanking for one or more antennas of the wireless device for the first wireless link. For example, in a DSDA scenario in which the first wireless link is configured for voice communication, the wireless device may determine to limit the rank reported (e.g., to rank 1, or to rank 1 or rank 2, e.g., among various other possibilities) if the first wireless link is determined to be subject to transmit and/or receive blanking from the second wireless link. Such an approach may be useful in such a scenario since low rank communication may often be sufficient for voice communications and may reduce or avoid the possibility of blanking on the first wireless link resulting in high BLER, at least according to some embodiments.

As another possibility, in some instances, the wireless device may determine to provide a "fake ACK" when receive blanking causes the wireless device to be unable to successfully receive and decode a downlink communication. Use of such a fake ACK may help the wireless device avoid having its rank reduced if such rank reduction would not be commensurate with the channel state for the first wireless link, at least according to some embodiments. For example, in some embodiments, a wireless device may determine that a subframe scheduled for a downlink communication according to the first wireless link is blanked based at least in part on a SRS transmission for the second wireless link, and may transmit an acknowledgement for the subframe based at least in part on the subframe being blanked based at least in part on the SRS transmission for the second wireless link. In some scenarios, the wireless device may further determine a rank supported by the channel state of the first wireless link, and may determine whether transmitting a negative acknowledgement for the subframe increases downlink BLER for the first wireless link above a threshold configured to trigger rank reduction to a rank below the rank supported by the channel state of the first wireless link. In such a scenario, the acknowledgement for the subframe may be transmitted further based at least in part on determining that transmitting a negative acknowledgement for the subframe would increase downlink BLER for the first wireless link above the threshold configured to trigger rank reduction to a rank below the rank supported by the channel state of the first wireless link.

Another possible modification to CSF reporting for the first wireless link could include a modification selected to attempt to avoid a conflict between SRS transmission and CSF reporting that could cause the wireless device to be unable to perform CSF reporting. For example, in some scenarios, it may be possible for periodic CSF reporting for the first wireless link and periodic SRS transmissions for the second wireless link to be scheduled in an overlapping manner using a same transmit antenna. In such a scenario, the antenna used for the periodic SRS transmissions at the same time that the periodic CSF reporting is configured (or at least an overlapping time) may be blanked for the CSF reporting. Accordingly, the wireless device may detect when such a scenario is occurring, e.g., either when signaling received by the wireless device configuring the periodic CSF reporting for the first wireless link results in such a conflict or when signaling received by the wireless device configuring the periodic SRS transmissions for the second wireless link results in such a conflict. When such a conflict is detected (e.g., when periodic CSF reporting for the first wireless link and periodic SRS transmissions for the second wireless link are scheduled in an overlapping manner using the same transmit antenna), the wireless device may perform one or more operations to prevent the periodic CSF reporting for the first wireless link and the periodic SRS transmissions for the second wireless link from being scheduled in an overlapping manner using the same transmit antenna.

One possible such operation could include triggering antenna reselection for the first wireless link for the periodic CSF reporting. For example, when periodic CSF reporting for the first wireless link and periodic SRS transmissions for the second wireless link are scheduled in an overlapping manner using the same transmit antenna, it may be possible that the wireless device performs transmit antenna reselection for the first wireless link in such a manner that the transmit antenna used for the periodic SRS transmissions for the second wireless link is excluded from consideration for the transmit antenna reselection for the first wireless link. Thus, after transmit antenna reselection for the first wireless link, it may be the case that different transmit antennas are used to perform the periodic CSF reporting for the first wireless link and the periodic SRS transmissions for the second wireless link that are scheduled in an overlapping manner, potentially preventing the conflict and allowing the wireless device to perform the periodic CSF reporting as configured.

Another such possible operation could include triggering wireless link reestablishment for the first wireless link. For example, when periodic CSF reporting for the first wireless link and periodic SRS transmissions for the second wireless link are scheduled in an overlapping manner using the same transmit antenna, it may be possible that the wireless device triggers a reestablishment procedure according to the first wireless link, which may result in the wireless device receiving a new CSF reporting configuration, e.g., with the periodic CSF reporting potentially falling in a different time window than was previously configured. Thus, after the wireless link reestablishment for the first wireless link, it may be the case that the periodic CSF reporting for the first wireless link and the periodic SRS transmissions for the second wireless link are scheduled in a manner that does not include temporally overlapping use of the same antenna, potentially preventing the conflict and allowing the wireless device to perform the periodic CSF reporting as (newly) configured.

The wireless device may perform CSF reporting using the determined modification to its CSF reporting for the first wireless link. This may include reporting a modified RI, performing the CSF reporting using a reselected antenna to avoid the CSF reporting being blanked, performing the CSF reporting using a configuration acquired based on reestablishing the first wireless link to avoid the CSF reporting being blanked, and/or any other determined modifications to the CSF reporting for the first wireless link, according to various embodiments.

Note also that it may be possible that the wireless device performs antenna selection for the first wireless link based at least in part on the band combination for the first and second wireless links, e.g., including if there is potential for receive and/or transmit operations for the first wireless link to be blanked because of SRS transmissions for the second wireless link for the combination of bands in which the first and second wireless links are established. For example, the antenna selection for the first wireless link may be based at least in part on a receive blanking pattern for the first wireless link caused at least in part by transmitting SRS for the second wireless link for the band combination for the first and second wireless links.

As one such possibility, it may be possible that for adaptive receive antenna selection for the first wireless link (e.g., if the wireless device is selecting fewer than the maximum possible number of receive antennas for the first wireless link), antenna combinations that are subject to less blanking according to the receive blanking pattern for the first wireless link may be prioritized over antenna combinations that are subject to more blanking according to the receive blanking pattern for the first wireless link. Thus, for example, if the wireless device has 4 possible transmit/receive antennas, a first pair of receive antennas that experiences a receive blanking pattern where, over the course of a SRS period for the second wireless link, subframes subject to receive blanking include instances with (1, 1, 2, 2) receive antennas available may be prioritized over a second pair of receive antennas that experiences a receive blanking pattern where, over the course of the SRS period for the second RAT, subframes subject to receive blanking include instances with (1, 1, 1, 2) receive antennas available, e.g., since there may be 2 instances with only 1 receive antenna available over the course of the SRS period for the second wireless link for the first pair of receive antennas while there may be 3 instances with only 1 receive antenna available over the course of the SRS period for the second wireless link for the second pair of receive antennas. As another example, the second pair of receive antennas may be prioritized over a third pair of receive antennas that experiences a receive blanking pattern where, over the course of the SRS period for the second wireless link, subframes subject to receive blanking include instances with (0, 1, 1, 2) receive antennas available, e.g., since there may be 0 instances with 0 receive antennas available over the course of the SRS period for the second wireless link for the second pair of receive antennas while there may be 1 instance with 0 receive antennas available over the course of the SRS period for the second wireless link for the third pair of receive antennas. Note that if such prioritization is implemented, it may be possible that signal strength for antenna combinations that have the same priority based on the receive blanking pattern may be used as a secondary priority consideration when performing the antenna selection, at least according to some embodiments.

As a further possibility, it may be possible that one or more antennas are removed from consideration for transmit antenna selection based at least in part on the band combination for the first and second wireless links. For example, it may be possible that use of one antenna as the transmit antenna for the first wireless link when a band combination that is subject to transmit/receive blanking for the first wireless link due to SRS transmissions for the second wireless link is in use could result in more severe receive blanking for the first wireless link. In such a scenario, it may be possible to improve wireless device performance by generally excluding such an antenna from consideration for transmit antenna selection for the first wireless link in such a scenario.

As a still further possibility, it may be possible that the wireless device prioritizes reception configurations that use greater numbers of antennas over reception configurations that use smaller numbers of antennas for the first wireless link based at least in part on the band combination for the first and second wireless links, at least for certain types of communication. For example, for certain types of communication (e.g., voice communications, large downloads, and/or any of various other possible types of communications) that may be significantly impacted by decreased throughput and/or increased latency from receive blanking for the first wireless link (which could include more severe impacts for reception configurations that use smaller numbers of antennas for the first wireless link), the wireless device may prioritize one or more reception configurations that use more antennas than one or more other reception configurations for the first wireless link. As one such possibility, for a wireless device that includes (at least) 4 antennas, it may be possible that the wireless device prioritizes 4 antenna reception over 2 antenna reception when performing antenna selection for the first wireless link for a band combination for which the first wireless link may be subject to transmit/receive blanking due to SRS transmissions for the second wireless link, at least for certain configured communication types. Other possible antenna configurations and selection options are also possible.

As a yet further possibility, it may be possible that a wireless device determines to drop one or more SRS transmissions for the second wireless link, e.g., in order to reduce the impact on the first wireless link. For example, in a scenario in which the first and second wireless links are both NR wireless links and are associated with different subscriber identities, where one is configured for voice communication and one is configured for data communication, some SRS transmissions for the second wireless link that would cause transmit and/or receive blanking for the first wireless link may be dropped. The selection of the SRS transmissions that are dropped may depend on which wireless link is configured for voice communication and which is configured for data communication, at least in some instances. For example, as one possibility, if the first wireless link is configured for voice communication and the second wireless link is configured for data communication, SRS transmissions of second wireless link that would cause transmit blanking to the first wireless link may be dropped. As another possibility, if the first wireless link is configured for data communication and the second wireless link is configured for voice communication, all SRS transmissions except for codebook SRS transmissions of second wireless link may be dropped. Other approaches to SRS transmission dropping to mitigate transmit/receive blanking impacts on another wireless link are also possible.

Thus, at least according to some embodiments, the method of FIG. 5 may be used to mitigate the potential negative impacts of transmit and/or receive blanking for one wireless link that is caused by the operations of another wireless link. This may result in better performance, potentially including greater throughput, increased spectrum efficiency, reduced latency, and/or other benefits, and improved overall user experience for wireless devices implementing the method of FIG. 5, at least in some instances.

Figure 6:
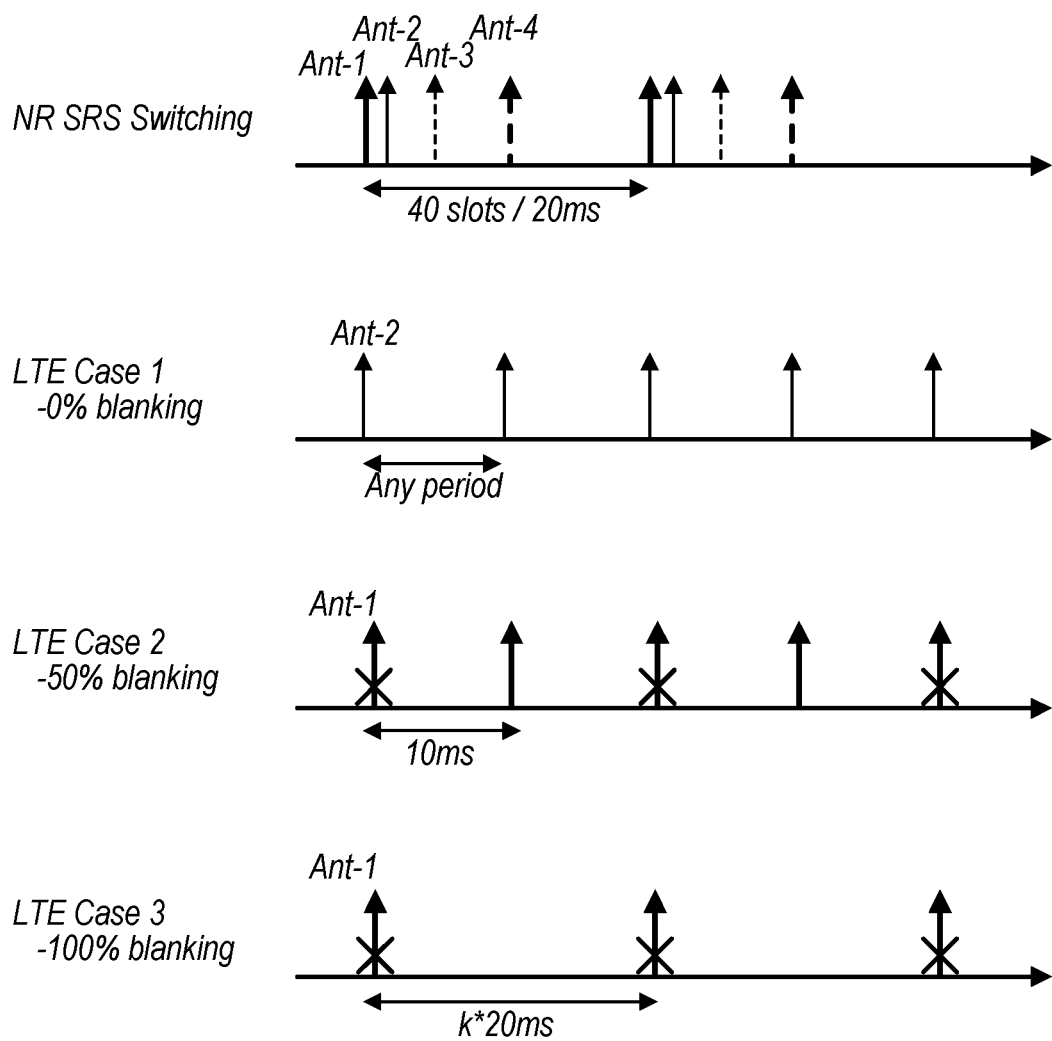
FIG. 6 illustrates exemplary aspects of various possible LTE channel state feedback transmit blanking scenarios in view of NR SRS switching, according to some embodiments.

FIG. 6 and Additional Information

FIG. 6 illustrate further aspects that might be used in conjunction with the method of FIG. 5 if desired. It should be noted, however, that the exemplary details illustrated in and described with respect to FIG. 6 are not intended to be limiting to the disclosure as a whole: numerous variations and alternatives to the details provided herein below are possible and should be considered within the scope of the disclosure.

It is possible for a wireless device with multiple antennas that implements multiple wireless communication technologies to have hardware conflicts, at least when operating in certain bands, for example between which antennas can be used for transmission and/or reception for each wireless communication technology at any given time.

As one example, it some instances, a wireless device with a non standalone (NSA) 5G NR connection, which is operating in LTE band B3 and NR band n41, and which has 4 antennas, could possibly have a conflict where at least some LTE B3 receive and transmit capability is blanked (not used) as a result of NR transmit chain activity. Such a conflict could occur if the bands used for NR and LTE by a wireless device share the same MBH antenna and related crossing switch in the radio frequency (RF) front end (FE) of the wireless device, at least as one possibility. This blanking could include receive blanking before switching for NR sounding reference signal (SRS) transmission if the LTE receiving shares the same antenna as NR, receive blanking after switching for NR SRS transmission if the LTE receiving shares the same antenna as NR, and/or transmit blanking after switching for NR SRS transmission if the LTE transmitting shares the same antenna as NR.

5G NSA communication may commonly include and potentially require simultaneous LTE/NR transmission/reception. However, such NR SRS 1 transmit 4 receive (1T4R) switching may potentially cause frequent interruptions to LTE receive and/or transmit operations. For example, in some configurations, 4 NR SRS transmissions may be performed in 40 slots, which could result in 3 interruptions in 20 subframes to LTE reception. Note that other configurations and interruption frequencies and/or patterns are also possible.

One possible result of such blanking of LTE antenna use caused by NR SRS switching could include an LTE throughput downgrade. For example, in a scenario in which an NSA split bearer is configured including LTE and NR, NR 1T4R SRS triggered blanking could cause LTE downlink block error rate (BLER) to be greater than 10%. Based on LTE BLER rising above such a level, the network may respond by downgrading LTE downlink modulation and coding scheme to 1, which could cause a potentially significant throughput downgrade, which could be at any of a variety of possible scales, even possibly including a throughput downgrade of over 90% in some instances.

Another possible result of such blanking of LTE antenna use caused by NR SRS switching could include blanking of LTE channel state feedback (CSF) transmission. For example, LTE CSF may be blocked at any time that the same transmit antenna is selected for both NR and LTE in a configured CSF transmission slot blanked by NR SRS switching. In certain configurations (e.g., depending at least in part on the periodicity of LTE CSF and NR SRS), this may result in some or all CSF transmissions being blanked. For example, if the LTE CSF (CQI/PMI/RI) collides with the NR SRS and have the same period or periods that are multiples of the same value, the LTE CSF transmissions may be regularly blocked for as long as that configuration lasts.

Thus, in a scenario in which such transmissions have a period that is 20 ms, it may be the case that there is a probability of ½0 of such collisions occurring, at least according to some embodiments. It may be possible that such a scenario may be possible for LTE B3/NR n41 and/or LTE B39/NR n41 band combinations for both 1T4R and 1T2R SRS switching, at least according to some embodiments.

FIG. 6 illustrates exemplary aspects of various such possible LTE CSF transmit blanking scenarios in view of NR SRS switching, according to some embodiments. In the illustrated scenarios, NR SRS switching may be performed between 4 antennas of a wireless device (ant-1, ant-2, ant-3, ant-4) over a 40 slot/20 ms period.

In a first scenario, LTE CSF transmissions may use ant-2, and the configured timing for the LTE CSF transmissions may be offset from the NR SRS switching such that the LTE CSF transmissions can be performed without any blanking of the antenna used for those transmissions. In a second scenario, LTE CSF transmissions may use ant-1, and the configured timing for the LTE CSF transmissions may be aligned with the NR SRS switching such that the LTE CSF transmissions are blanked by the NR SRS switching once every 20 ms. However, in this second scenario, the CSF period may be 10 ms, such that every other CSF transmission is not blanked. In a third scenario, LTE CSF transmissions may also use ant-1, and the configured timing for the LTE CSF transmissions may also be aligned with the NR SRS switching such that the LTE CSF transmissions are blanked by the NR SRS switching once every 20 ms. In this third scenario, the CSF period may be 20 ms, such that all CSF reports are blanked.

The impact of such CSF transmit blanking on performance may vary in different scenarios. In one possible scenario, for B3/n41 mode 4 Rx operation, in downlink, the spectrum efficiency could be reduced by 5-10% due to blanked CQI and/or reduced by 30% due to blanked RI, while in uplink, the throughput could be reduced by 5% due to blanked PUSCH transmission. In another possible scenario, for B39/n41 mode, for consecutive traffic (such as file transfer protocol (FTP) traffic, in some instances), the spectrum efficiency could be reduced by 5-12% due to blanked CQI, and for intermittent traffic (such as at least some gaming traffic, in some instances), the spectrum efficiency could be reduced by 20-25% due to blanked CQI, and the latency may be increased by 0-4 ms due to blanked CQI. Note that while these examples are provided for illustrative purposes, numerous other possible scenarios and associated outcomes are also possible, e.g., depending on device design, configuration parameters, and/or any of various other possible considerations.

In some instances, it may be possible that LTE spectrum efficiency could be significantly negatively impacted by blanking caused by NR SRS switching for a 4 antenna wireless device that is configured for 2 antenna operation (e.g., for power consumption reduction, thermal mitigation, and/or for any of various other possible reasons) with adaptive receive diversity (ARD). For example, in such a scenario, it may be possible that one or both of the antennas selected for the 2 Rx ARD are blanked in certain slots or subframes by the NR SRS switching. If both antennas are blanked (e.g., if the wireless device has 0-Rx) during a transmission to the wireless device, it may be the case that not only is the wireless device unable to receive the transmission, but also the wireless device may be unable to receive a later re-transmission, for example since redundancy version 0 (RV0) in the 1st transmission may be missing and RV1/2/3 in the re-transmission may not be self-decodable. Further, even if only one antenna is blanked (e.g., if the wireless device has 1-Rx) during a transmission, it may be possible that a 1st transmission with 2 codewords could not succeed (e.g., since the wireless device may be unable to perform 2 layer reception without 2 available antennas). Thus, it may be possible that there could be much more unexpected failure with 2-Rx ARD than 4-Rx, at least in some instances. In one example configuration and scenario, it may be possible for ARD 2-Rx to experience spectrum efficiency loss of up to 70% due to blanking caused by NR SRS switching, in comparison to spectrum efficiency loss of up to 40% for ARD 4-Rx. Note again that while this example is provided for illustrative purposes, numerous other possible configurations/scenarios and associated outcomes are also possible.

At least for some device designs/configurations, it may be possible that the LTE Rx blanking pattern may differ for different combinations of LTE and NR transmit antenna selections. For example, some combinations may be more likely to cause blanked slots or subframes than other combinations, and/or may impact certain Rx antenna combinations more than other Rx antenna combinations. At least in some instances, it may be possible that wireless device performance may depend nearly as much on (or possibly more than) the blanked Rx pattern than on downlink signal strength.

For example, for 4 Rx operation, it may be possible that performance has a significant dependence on the currently selected LTE Tx antenna, such as if use of that antenna tends to result in more LTE Rx blanking than other possible LTE Tx antennas. For 2 Rx ARD operation, it may be possible that performance has a significant dependence on the selected 2-Rx combination, such as if different Rx combinations experience different likelihood and/or frequency of 0-Rx and 1-Rx slots/subframes for the current <LTE Tx antenna, NR SRS Tx antenna> combination, e.g., since 0-Rx and 1-Rx slots/subframes can have a significant impact on spectrum efficiency. For example, it could be possible that a pair of Rx antennas with lower signal strength but that is less impacted by a current <LTE Tx antenna, NR SRS Tx antenna> combination than another pair of Rx antennas could provide better performance than that other pair of Rx antennas during 2 Rx ARD operation, at least as one possibility.

Another possible impact from LTE blanking due to NR SRS switching could include an increase to voice over LTE (VoLTE) latency. In some instances, the voice latency increase may be greater for LTE 2-Rx more than for 4-Rx. For example, LTE ARD 2-RX may generally have more instances of interruptions/inability to successfully receive and decode transmissions (e.g., 0-Rx and/or 1-Rx every 20 ms in LTE ARD 2-Rx, as one possibility) than LTE 4-Rx. In some instances, voice latency with adaptive rank may be increased more than for rank 1. For example, since there may be some periodic 1-Rx or 0-Rx subframes in LTE due to NR SRS switching, rank 2 and rank 4 transmissions may not be as well suited to avoid potential voice latency increases from LTE blanking as rank 1 transmissions. In one example configuration, it may be possible that LTE 4-Rx VoLTE may experience increased latency within 10 ms from blanking due to NR SRS switching, and/or that LTE 2-Rx VoLTE may experience increased latency up to 15 ms from blanking due to NR SRS switching. In the same example configuration, for adaptive rank, the average latency may be distributed from 2 ms to 15 ms, with bigger latency jitter than for rank 1, while for limited rank 1, the latency may converge.

Still another possible impact from LTE blanking due to NR SRS switching could include poor VoLTE spectrum efficiency. In particular, the MCS for a wireless device may be reduced to 0 if downlink voice packets are periodically scheduled in 0-Rx subframes. At least in some embodiments, VoLTE downlink voice packets may be transmitted periodically, and as previously noted herein, it may be possible in some ARD 2-Rx configurations that 0-Rx subframes can occur periodically (e.g., every 20 ms, in accordance with the NR SRS period). In such a scenario, a first/initial downlink transmission that is scheduled in a 0-Rx subframe may be guaranteed to fail. A 50% BLER may be expected with the periodic pattern of <Failure of 1st Tx, Pass of 2nd Tx>, which may accordingly trigger the network to adjust the MCS down to 0 (e.g., to maintain a target 10% BLER). Thus, at least according to some configurations, it may be possible that there is a ½₀ probability of this occurring.

Thus, there may be several possible impacts and aspects of wireless device performance that can be affected by NR SRS triggered LTE Tx/Rx blanking, at least in 5G NR NSA scenarios, such that it may be possible to improve wireless device performance in those scenarios by providing techniques to mitigate those impacts. One such possibility may include dynamically determining how to perform RI reporting based at least in part on NR SRS period. For example, if the NR SRS period is less than a configured threshold and downlink BLER is over 10%, it may be possible for the wireless device to select a lower RI than it might otherwise select (e.g., based on channel conditions alone). This may reduce the BLER experienced by the wireless device, for example since there may be fewer downlink transmissions that the wireless device is unable to receive because fewer receive antennas are available than would be needed for the rank of the transmission, which may in turn reduce the likelihood that the network reduces the MCS to 0.

Another possible technique to mitigate the impact of NR SRS triggered LTE Tx/Rx blanking on downlink throughput may include reporting acknowledgement instead of negative acknowledgement for the downlink CRC for subframes for which failure to receive is caused by Rx blanking due to NR SRS (e.g., and not caused by poor channel quality). This may decrease the likelihood that the network reduces the MCS to 0 due to the blanking triggered by NR SRS and when the actual channel conditions for the wireless device do not warrant such an MCS reduction.

Yet another technique that may potentially improve wireless device performance may include use of adaptive transmit diversity re-selection. For example, in a scenario in which a wireless device receives LTE RRC signaling to (re)configure CSF, the wireless device may determine if the new periodic LTE CQI/PMI/RI reporting occasions overlap with NR SRS slots. If LTE CSF overlaps with NR SRS, the wireless device may further determine if the current LTE configuration uses the same Tx antenna as NR SRS in the configured CSF occasions. If the LTE CSF reporting occasions are expected to be blanked by the NR SRS (e.g., if they use the same antenna during the configured LTE CSF reporting occasions), the wireless device may trigger LTE ATD (re)selection. The LTE ATD scheme may remove the current Tx antenna from the candidate list, and select the best antenna from the remaining antennas for the transmission.

As another possibility, when a wireless device receives NR RRC signaling to (re)configure SRS resources, the wireless device may determine if the periodic CQI/PMI/RI occasions overlap with the new NR SRS slots and use the same Tx antenna. In such a scenario, similar to the previous scenario, if LTE CSF Tx occasions are expected to be blanked by NR SRS occasions, the wireless device may trigger LTE ATD (re)selection, including removing the current Tx antenna from the candidate list, and selecting the best antenna from the remaining antennas for the transmission.

As still another possibility, when a wireless device triggers LTE ATD (re)selection, it may determine if the periodic CQI/PMI/RI occasions overlap with NR SRS slots and use the newly selected antenna, and if the LTE CSF Tx occasions are expected to be blanked by NR SRS occasions, the wireless device may not trigger this LTE ATD (re)selection.

Another related technique to potentially improve wireless device performance may include removing an antenna from the ATD candidate list based at least in part on the potential impact of its combination with an NR SRS antenna. For example, if a certain LTE Tx antenna in conjunction with NR SRS operation causes more LTE Rx blanking than other LTE Tx antennas in a given configuration (e.g., as may be the case at least for certain LTE/NR band combinations, possibly depending on hardware configuration for the wireless device), it may be possible that the wireless device removes that antenna from the ATD candidate list, which may result in better downlink performance, at least in some embodiments.

A further possible technique for avoiding LTE CSF Tx blanking could include making use of LTE reestablishment. For example, in a scenario in which a wireless device receives LTE RRC signaling to (re)configure CSF, the wireless device may determine if the new periodic LTE CQI/MPI/RI reporting occasions overlap with NR SRS slots. If LTE CSF overlaps with NR SRS, the wireless device may further determine if the current LTE configuration uses the same Tx antenna as NR SRS in the configured CSF occasions. If the LTE CSF reporting occasions are expected to be blanked by the NR SRS (e.g., if they use the same antenna during the configured LTE CSF reporting occasions), the wireless device may trigger an LTE reestablishment procedure to retrieve a new CSF configuration. Since the likelihood of a conflict between the LTE CSF configuration and the NR SRS configuration being in conflict may be relatively low (e.g., 1/20, in some instances, as previously noted herein), there may be a correspondingly high likelihood that the LTE CSF configuration and the NR SRS configuration are not in conflict after such a LTE reestablishment procedure.

Similarly, in a scenario in which a wireless device receives NR RRC signaling to (re)configure SRS resources, the wireless device may determine if the periodic LTE CQI/MPI/RI reporting occasions overlap with the new NR SRS slots and if the current LTE configuration uses the same Tx antenna as NR SRS in the configured CSF occasions. If the LTE CSF reporting occasions are expected to be blanked by the NR SRS (e.g., if they use the same antenna during the configured LTE CSF reporting occasions), the wireless device may trigger an LTE reestablishment procedure to retrieve a new CSF configuration.

Another possible technique for mitigating the impact of NR SRS triggered LTE Tx/Rx blanking may include selectively prioritizing 4-Rx operation over 2-Rx operation, at least for certain scenarios that may be most affected by the NR SRS triggered LTE Tx/Rx blanking in 2-Rx configurations. For example, it may be possible that a wireless device in NSA B3/n41 mode may prioritize using a 4-Rx configuration over using a 2-Rx configuration in case of large data downloads (e.g., for which greater decreases to spectral efficiency for 2-Rx configurations relative to 4-Rx configurations may have a particularly significant impact), and/or in case of an ongoing VoLTE call (e.g., for which greater latency increases and/or spectral efficiency decreases for 2-Rx configurations relative to 4-Rx configurations may have a particularly significant impact).

Still another possible technique for mitigating the impact of NR SRS triggered LTE Tx/Rx blanking may include considering LTE Rx blanking patterns when performing ARD (re)selection. For example, as one possibility, for a wireless device in NSA B3/n41 mode, if the wireless device is configured for 2-Rx operation in LTE, the UE may prioritize certain Rx combinations over others based on the blanked Rx pattern for the wireless device. The priority could be based on the available number of Rx antennas during NR SRS triggered LTE Rx blanking for each possible combination of Rx antennas. Thus, a combination with (1,1,2,2) antennas available during NR SRS triggered Rx blanking slots over the course of a SRS period may be prioritized over a combination with (1,1,1,2) antennas available during NR SRS triggered Rx blanking slots over the course of a SRS period, and both such combinations may be prioritized over a combination with (0,1,1,2) antennas available during NR SRS triggered Rx blanking slots over the course of a SRS period, at least as one possibility. In such a scenario, signal strength may be used as a secondary priority consideration, for example if two Rx antenna combinations have the same availability during during NR SRS triggered LTE Rx blanking.

SRS triggered Tx/Rx blanking may potentially also or alternatively occur when certain band combinations are used in dual SIM dual active (DSDA) scenarios. For example, as one possibility, for the combination of the 5G NR n1 band and the 5G NR n41 band, it may be possible that Tx and/or Rx blanking on the n1 band is caused by SRS transmissions on the n41 band. While it may be possible for a UE to report scheduling limitations in certain band combinations using UE capability reporting (e.g., via one or more UE capability parameters or features such as any or all of BandCombination, BandParameters, srs-TxSwitch, txSwitchImapctToRx, txSwitchWithAnotherBand, and/or any of various other possible UE capability parameters or features) for multiple connections with the same carrier, since the connections using the different SIMS of the UE may be established with different carriers and independently of each other in the case of a DSDA scenario, reporting such capability information may not be usable by the (e.g., independently operated) networks to avoid scheduling downlink and uplink communications in interrupted slots.

Accordingly, it may also be useful to provide techniques for handling transmit and receive blanking for DSDA capable wireless devices, at least according to some embodiments. Such techniques may include reporting a (e.g., artificially) low rank for a wireless link being impacted by receive blanking, and/or dropping certain SRS transmissions for a wireless link that is causing transmit and/or receive blanking to another wireless link associated with a different SIM. In some instances, the technique(s) selected by a UE for handling the blanking may depend at least in part on the wireless link types or uses for each wireless link. For example, in some scenarios, one SIM of a DSDA device may be configured for performing voice communication, while another SIM of the DSDA device may be configured for performing data communication. In such a scenario, the handling technique(s) may depend on which of a link associated with the voice SIM or the data SIM is causing the blanking, and which is being impacted by the blanking.

For example, as one possibility, in a scenario in which a DSDA device has established a wireless link in the n1 band for voice communication and a wireless link in the n41 band for data communication, as it may be the case that rank 1 may generally be sufficient for the voice traffic, the UE may report a low rank (e.g., even if the channel conditions would otherwise support a higher rank) based at least in part on the currently active band combination, e.g., to avoid the possibility of high BLER being caused by receive blanking triggered by SRS transmissions in the n41 band.

As another possibility, in a scenario in which a DSDA device has established a wireless link in the n1 band for voice communication and a wireless link in the n41 band for data communication, the voice communication may be prioritized over the data communication, such that the UE may determine to drop one or more SRS transmissions to avoid SRS switching impact in the n41 band on voice transmissions in the n1 band. For example, if a SRS transmission in the n41 band is determined to cause Tx blanking to a scheduled uplink transmission in the n1 band, the UE may drop the corresponding SRS transmission.

As a still further possibility, in a scenario in which a DSDA device has established a wireless link in the n1 band for data communication and a wireless link in the n41 band for voice communication, the UE may determine to drop at least some SRS transmissions (e.g., except codebook SRS transmissions) in the n41 band, e.g., to reduce the Tx/Rx blanking impact on the n1 band. This approach may benefit the data throughput in the n1 band, potentially with minimal or no impact to the ability of the UE to perform voice communications in the n41 band, for example since rank 1 communication may be sufficient for the voice traffic needs, and a 1T4R configuration (e.g., such as might be needed for higher rank communication) may not be necessary for the voice traffic.

Note that while the n1/n41 band combination is used in these examples for illustrative purposes and should not be considered limiting to the disclosure as a whole; the transmit/receive blanking handling techniques for DSDA configurations described herein may also or alternatively be used in conjunction with any of various other possible band combinations.

In the following further exemplary embodiments are provided.

One set of embodiments may include an apparatus, comprising: a processor configured to cause a wireless device to: establish wireless links according to a first radio access technology (RAT) and a second RAT; determine to perform transmit and receive blanking for one or more antennas of the wireless device for the first RAT to perform sounding reference signal (SRS) transmissions for the second RAT based at least in part on a band combination for the wireless links established according to the first RAT and the second RAT; determine a modification to channel state feedback (CSF) reporting for the first RAT based at least in part on the transmit and receive blanking for one or more antennas of the wireless device for the first RAT to perform SRS transmissions for the second RAT; and perform CSF reporting using the determined modification.

According to some embodiments, the processor is further configured to cause the wireless device to: determine a rank indicator to report for the wireless link established according to the first RAT, wherein the rank indicator is determined based at least in part on a SRS period for the second RAT; and transmit channel state feedback for the wireless link according to the first RAT, wherein the channel state feedback includes the determined rank indicator.

According to some embodiments, determining the rank indicator to report includes modifying a rank indicator selected based on a channel state of the wireless link established according to the first RAT to indicate a lower rank.

According to some embodiments, the processor is further configured to cause the wireless device to: determine whether the SRS period for the second RAT is less than a SRS period threshold; determine whether a downlink block error rate (BLER) for the first RAT is greater than a downlink BLER threshold; and determine a receive blanking pattern for the first RAT, wherein the receive blanking pattern is based at least in part on when SRS for the second RAT are transmitted, wherein the rank indicator is determined based at least in part on the receive blanking pattern for the first RAT if the SRS period for the second RAT is less than the SRS period threshold and the downlink BLER for the first RAT is greater than the downlink BLER threshold.

According to some embodiments, the processor is further configured to cause the wireless device to: determine that a subframe scheduled for a downlink communication according to the first RAT is blanked based at least in part on a SRS transmission for the second RAT; transmit an acknowledgement for the subframe based at least in part on the subframe being blanked based at least in part on a SRS transmission for the second RAT.

According to some embodiments, the processor is further configured to cause the wireless device to: determine a rank supported by a channel state of the wireless link established according to the first RAT; and determine whether transmitting a negative acknowledgement for the subframe increases downlink block error rate (BLER) for the wireless link established according to the first RAT above a threshold configured to trigger rank reduction to a rank below the rank supported by the channel state of the wireless link established according to the first RAT, wherein the acknowledgement for the subframe is transmitted further based at least in part on whether transmitting a negative acknowledgement for the subframe increases downlink BLER for the wireless link established according to the first RAT above the threshold configured to trigger rank reduction to a rank below the rank supported by the channel state of the wireless link established according to the first RAT.

According to some embodiments, the processor is further configured to cause the wireless device to: determine that periodic CSF reporting for the first RAT and periodic SRS transmissions for the second RAT are scheduled in an overlapping manner using a same transmit antenna; and perform transmit antenna reselection for the first RAT based at least in part on periodic CSF reporting for the first RAT and periodic SRS transmissions for the second RAT being scheduled in an overlapping manner using the same transmit antenna, wherein a transmit antenna used for the periodic SRS transmissions for the second RAT is excluded from consideration for the transmit antenna reselection for the first RAT.

According to some embodiments, the processor is further configured to cause the wireless device to: determine that periodic CSF reporting for the first RAT and periodic SRS transmissions for the second RAT are scheduled in an overlapping manner using a same transmit antenna; and reestablish the wireless link according to the first RAT based at least in part on periodic CSF reporting for the first RAT and periodic SRS transmissions for the second RAT being scheduled in an overlapping manner using the same transmit antenna.

Another set of embodiments may include a wireless device, comprising: an antenna; a radio operably coupled to the antenna; and a processor operably coupled to the radio; wherein the wireless device is configured to: establish wireless links according to a first radio access technology (RAT) and a second RAT; determine that periodic channel state feedback (CSF) reporting for the first RAT is scheduled in an overlapping manner with periodic sounding reference signal (SRS) transmissions for the second RAT; determine that the periodic CSF reporting for the first RAT and the periodic SRS transmissions for the second RAT that are scheduled in an overlapping manner currently use a same transmit antenna; and perform one or more operations to prevent periodic CSF reporting for the first RAT and periodic SRS transmissions for the second RAT from being scheduled in an overlapping manner using the same transmit antenna based at least in part on determining that the periodic CSF reporting for the first RAT and the periodic SRS transmissions for the second RAT that are scheduled in an overlapping manner currently use the same transmit antenna.

According to some embodiments, to perform the one or more operations to prevent periodic CSF reporting for the first RAT and periodic SRS transmissions for the second RAT from being scheduled in an overlapping manner using the same transmit antenna, the wireless device is further configured to: perform transmit antenna reselection for the first RAT, wherein the transmit antenna used for the periodic SRS transmissions for the second RAT is excluded from consideration for the transmit antenna reselection for the first RAT.

According to some embodiments, to perform the one or more operations to prevent periodic CSF reporting for the first RAT and periodic SRS transmissions for the second RAT from being scheduled in an overlapping manner using the same transmit antenna, the wireless device is further configured to: reestablish the wireless link according to the first RAT.

According to some embodiments, determining that the periodic CSF reporting for the first RAT is scheduled in an overlapping manner with the periodic SRS transmissions for the second RAT is based at least in part on signaling received by the wireless device configuring the periodic CSF reporting for the first RAT.

According to some embodiments, determining that the periodic CSF reporting for the first RAT is scheduled in an overlapping manner with the periodic SRS transmissions for the second RAT is based at least in part on signaling received by the wireless device configuring the periodic SRS transmissions for the second RAT.

Yet another set of embodiments may include a method, comprising: by a wireless device: establishing wireless links according to a first radio access technology (RAT) and a second RAT; and performing antenna selection for the first RAT based at least in part on a band combination for the wireless links established according to the first RAT and the second RAT.

According to some embodiments, the antenna selection for the first RAT is further based at least in part on a receive blanking pattern for the first RAT, wherein the receive blanking pattern for the first RAT is for transmitting sounding reference signals (SRS) for the second RAT for the band combination for the wireless links established according to the first RAT and the second RAT.

According to some embodiments, for adaptive receive antenna selection for the first RAT, antenna combinations that are subject to less blanking according to the receive blanking pattern for the first RAT are prioritized over antenna combinations that are subject to more blanking according to the receive blanking pattern for the first RAT.

According to some embodiments, one or more antennas are removed from consideration for transmit antenna selection based at least in part on the band combination for the wireless links established according to the first RAT and the second RAT.

According to some embodiments, the wireless device includes at least 4 antennas, wherein 4 antenna reception is prioritized over 2 antenna reception for the antenna selection for the first RAT based at least in part on the band combination for the wireless links established according to the first RAT and the second RAT.

According to some embodiments, 4 antenna reception is prioritized over 2 antenna reception further based at least in part on one or more types of communication currently being performed via the wireless link established according to the first RAT.

According to some embodiments, the first RAT is LTE, wherein the second RAT is NR.

A further exemplary embodiment may include a method, comprising: performing, by a wireless device, any or all parts of the preceding examples.

A further set of embodiments may include a wireless device, comprising: one or more antennas; a radio operably coupled to the one or more antennas; and a processor operably coupled to the radio; wherein the wireless device is configured to: establish a first wireless link using a first subscriber identity; establish a second wireless link using a second subscriber identity; determine that sounding reference signal (SRS) transmissions for the second wireless link cause transmit and receive blanking for one or more antennas of the wireless device for the first wireless link; and modify communication according to one or more of the first wireless link or the second wireless link based at least in part on determining that SRS transmissions for the second wireless link cause transmit and receive blanking for one or more antennas of the wireless device for the first wireless link.

According to some embodiments, the wireless device is further configured to: select a rank indicator to report for the first wireless link based at least in part on determining that SRS transmissions for the second wireless link cause transmit and receive blanking for one or more antennas of the wireless device for the first wireless link.

According to some embodiments, the wireless device is further configured to: wherein selecting the rank indicator to report for the first wireless link includes modifying a rank indicator selected based on a channel state of the first wireless link to indicate a lower rank.

According to some embodiments, the wireless device is further configured to: determine to drop one or more SRS transmissions for the second wireless link based at least in part on determining that SRS transmissions for the second wireless link cause transmit and receive blanking for one or more antennas of the wireless device for the first wireless link.

According to some embodiments, one of the first wireless link or the second wireless link is configured for voice communication, wherein the other of the first wireless link or the second wireless link is configured for data communication, wherein modifying communication according to one or more of the first wireless link or the second wireless link is further based at least in part on which of the first wireless link or the second wireless link is configured for voice communication and which of the first wireless link or the second wireless link is configured for data communication.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish wireless links according to a first radio access technology (RAT) and a second RAT;
determine to perform transmit and receive blanking for one or more antennas of the wireless device for the first RAT to perform sounding reference signal (SRS) transmissions for the second RAT based at least in part on a band combination for the wireless links established according to the first RAT and the second RAT;
determine a modification to channel state feedback (CSF) reporting for the first RAT based at least in part on the transmit and receive blanking for one or more antennas of the wireless device for the first RAT to perform SRS transmissions for the second RAT; and
perform CSF reporting using the determined modification, wherein the modification includes:
determining a rank indicator to report for the wireless link established according to the first RAT, wherein the rank indicator is determined based at least in part on a SRS period for the second RAT; and
transmitting CSF for the wireless link according to the first RAT, wherein the CSF includes the determined rank indicator.

2. The apparatus of claim 1,
wherein determining the rank indicator to report includes modifying a rank indicator selected based on a channel state of the wireless link established according to the first RAT to indicate a lower rank.

3. The apparatus of claim 1, wherein the processor is further configured to cause the wireless device to:
determine whether the SRS period for the second RAT is less than a SRS period threshold;
determine whether a downlink block error rate (BLER) for the first RAT is greater than a downlink BLER threshold; and
determine a receive blanking pattern for the first RAT, wherein the receive blanking pattern is based at least in part on when SRS for the second RAT are transmitted, wherein the rank indicator is determined based at least in part on the receive blanking pattern for the first RAT if the SRS period for the second RAT is less than the SRS period threshold and the downlink BLER for the first RAT is greater than the downlink BLER threshold.

4. The apparatus of claim 1, wherein the processor is further configured to cause the wireless device to:
determine that a subframe scheduled for a downlink communication according to the first RAT is blanked based at least in part on a SRS transmission for the second RAT;
transmit an acknowledgement for the subframe based at least in part on the subframe being blanked based at least in part on a SRS transmission for the second RAT.

5. The apparatus of claim 4, wherein the processor is further configured to cause the wireless device to:

determine a rank supported by a channel state of the wireless link established according to the first RAT; and determine whether transmitting a negative acknowledgement for the subframe increases downlink block error rate (BLER) for the wireless link established according to the first RAT above a threshold configured to trigger rank reduction to a rank below the rank supported by the channel state of the wireless link established according to the first RAT, wherein the acknowledgement for the subframe is transmitted further based at least in part on whether transmitting a negative acknowledgement for the subframe increases downlink BLER for the wireless link established according to the first RAT above the threshold configured to trigger rank reduction to a rank below the rank supported by the channel state of the wireless link established according to the first RAT.

6. The apparatus of claim 1, wherein the processor is further configured to cause the wireless device to:

determine that periodic CSF reporting for the first RAT and periodic SRS transmissions for the second RAT are scheduled in an overlapping manner using a same transmit antenna; and perform transmit antenna reselection for the first RAT based at least in part on periodic CSF reporting for the first RAT and periodic SRS transmissions for the second RAT being scheduled in an overlapping manner using the same transmit antenna, wherein a transmit antenna used for the periodic SRS transmissions for the second RAT is excluded from consideration for the transmit antenna reselection for the first RAT.

7. The apparatus of claim 1, wherein the processor is further configured to cause the wireless device to:

determine that periodic CSF reporting for the first RAT and periodic SRS transmissions for the second RAT are scheduled in an overlapping manner using a same transmit antenna; and reestablish the wireless link according to the first RAT based at least in part on periodic CSF reporting for the first RAT and periodic SRS transmissions for the second RAT being scheduled in an overlapping manner using the same transmit antenna.

8. A wireless device, comprising:

an antenna;

a radio operably coupled to the antenna; and a processor operably coupled to the radio;

wherein the wireless device is configured to:

establish wireless links according to a first radio access technology (RAT) and a second RAT;

determine that periodic channel state feedback (CSF) reporting for the first RAT is scheduled in an overlapping manner with periodic sounding reference signal (SRS) transmissions for the second RAT;

determine that the periodic CSF reporting for the first RAT and the periodic SRS transmissions for the second RAT that are scheduled in an overlapping manner currently use a same transmit antenna; and perform one or more operations to prevent periodic CSF reporting for the first RAT and periodic SRS transmissions for the second RAT from being scheduled in an overlapping manner using the same transmit antenna based at least in part on determining that the periodic CSF reporting for the first RAT and the periodic SRS transmissions for the second RAT that are scheduled in an overlapping manner currently use the same transmit antenna.

9. The wireless device of claim 8, wherein to perform the one or more operations to prevent periodic CSF reporting for the first RAT and periodic SRS transmissions for the second RAT from being scheduled in an overlapping manner using the same transmit antenna, the wireless device is further configured to:

perform transmit antenna reselection for the first RAT, wherein the transmit antenna used for the periodic SRS transmissions for the second RAT is excluded from consideration for the transmit antenna reselection for the first RAT.

10. The wireless device of claim 8, wherein to perform the one or more operations to prevent periodic CSF reporting for the first RAT and periodic SRS transmissions for the second RAT from being scheduled in an overlapping manner using the same transmit antenna, the wireless device is further configured to:

reestablish the wireless link according to the first RAT.

11. The wireless device of claim 8, wherein determining that the periodic CSF reporting for the first RAT is scheduled in an overlapping manner with the periodic SRS transmissions for the second RAT is based at least in part on signaling received by the wireless device configuring the periodic CSF reporting for the first RAT.

12. The wireless device of claim 8, wherein determining that the periodic CSF reporting for the first RAT is scheduled in an overlapping manner with the periodic SRS transmissions for the second RAT is based at least in part on signaling received by the wireless device configuring the periodic SRS transmissions for the second RAT.

13. A method, comprising:

by a wireless device:

establishing wireless links according to a first radio access technology (RAT) and a second RAT; and performing antenna selection for the first RAT based at least in part on a band combination for the wireless links established according to the first RAT and the second RAT, wherein the antenna selection for the first RAT is further based at least in part on a receive blanking pattern for the first RAT, wherein the receive blanking pattern for the first RAT is for transmitting sounding reference signals (SRS) for the second RAT for the band combination for the wireless links established according to the first RAT and the second RAT;

wherein the wireless device includes at least 4 antennas, wherein performing antenna selection for the first RAT includes prioritizing 4 antenna reception over 2 antenna reception based at least in part on the band combination for the wireless links established according to the first RAT and the second RAT, and further based on one or more types of communication currently being performed via the wireless link established according to the first RAT.

14. The method of claim 13, wherein for adaptive receive antenna selection for the first RAT, antenna combinations that are subject to less blanking according to the receive blanking pattern for the first RAT are prioritized over antenna combinations that are subject to more blanking according to the receive blanking pattern for the first RAT.

15. The method of claim 13, wherein one or more antennas are removed from consideration for transmit antenna selection based at least in part on the band combination for the wireless links established according to the first RAT and the second RAT.

16. The method of claim 13,
wherein the first RAT is LTE,
wherein the second RAT is NR.

17. A wireless device, comprising:
one or more antennas;
a radio operably coupled to the one or more antennas; and
a processor operably coupled to the radio;
wherein the wireless device is configured to:
  establish a first wireless link using a first subscriber identity;
  establish a second wireless link using a second subscriber identity;
  determine that sounding reference signal (SRS) transmissions for the second wireless link cause transmit and receive blanking for one or more antennas of the wireless device for the first wireless link;
  modify communication according to one or more of the first wireless link or the second wireless link based at least in part on determining that SRS transmissions for the second wireless link cause transmit and receive blanking for one or more antennas of the wireless device for the first wireless link; and
  select a rank indicator to report for the first wireless link based at least in part on determining that SRS transmissions for the second wireless link cause transmit and receive blanking for one or more antennas of the wireless device for the first wireless link;
  wherein selecting the rank indicator to report for the first wireless link includes modifying a rank indicator selected based on a channel state of the first wireless link to indicate a lower rank.

18. The wireless device of claim 17, wherein the wireless device is further configured to:
  determine to drop one or more SRS transmissions for the second wireless link based at least in part on determining that SRS transmissions for the second wireless link cause transmit and receive blanking for one or more antennas of the wireless device for the first wireless link.

19. The wireless device of claim 17,
wherein one of the first wireless link or the second wireless link is configured for voice communication,
wherein the other of the first wireless link or the second wireless link is configured for data communication,
wherein modifying communication according to one or more of the first wireless link or the second wireless link is further based at least in part on which of the first wireless link or the second wireless link is configured for voice communication and which of the first wireless link or the second wireless link is configured for data communication.

* * * * *